Dec. 1, 1953  A. LATOUR  2,661,022
FLUID CONTROL DEVICE
Filed July 23, 1947  3 Sheets-Sheet 1

INVENTOR
ANDRE LATOUR
BY

Dec. 1, 1953  A. LATOUR  2,661,022
FLUID CONTROL DEVICE
Filed July 23, 1947  3 Sheets-Sheet 2
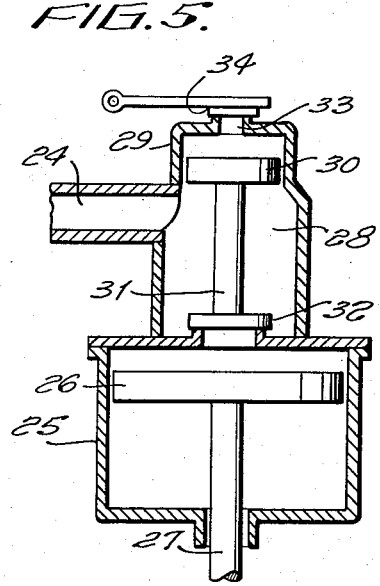
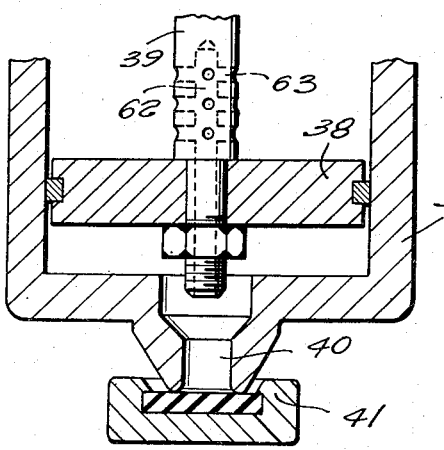
INVENTOR
ANDRE LATOUR
BY Dec. 1, 1953  A. LATOUR  2,661,022
FLUID CONTROL DEVICE Filed July 23, 1947  3 Sheets-Sheet 3

INVENTOR
ANDRE LATOUR
BY

Patented Dec. 1, 1953

2,661,022

UNITED STATES PATENT OFFICE 2,661,022

FLUID CONTROL DEVICE

André Latour, Grenoble, France, assignor to Etablissements Merlin & Gerin, Grenoble, France Application July 23, 1947, Serial No. 763,023
In France January 9, 1945

Section 1, Public Law 690, August 8, 1946
Patent expires January 9, 1965

11 Claims. (Cl. 137—679)

This invention relates to improvements in fluid control devices for instance shutters, permitting high speed opening of these devices, and keeping these devices in their open position without using the same means or without operating with the totality of the full means which had been applied to cause this high speed opening.

The invention may be regarded as a combination of means for effecting the opening of a fluid control device and of means adapted to keep or to contribute keeping this device in an open position.

The invention includes therefore the combination of two kinds of means namely of new means, the description of which will follow, as well as the combination of some of these new means with means already known, and, finally, the combination of means already known.

Among the means already known for controlling the opening, I will mention for example the electro-magnets.

This device is efficient in the most cases, but when a very quick action is desired it presents serious disadvantages. In fact the self-inductance of the electro-magnet impedes the very quick establishment of the actuating magnetic flow and causes a delay in the control of the flow of the fluid.

I mention also as known control devices acting by expansion, this control being obtained by connecting with the outer air one side of a piston, a shutter or a diaphragm maintained initially in balance by a pressure acting on both sides of the piston, the shutter or the diaphragm.

These devices offer generally a delay of action, and on the other hand do not allow the main valve to stay open if the pressure actuating the pneumatic motor is derived from the compressed gas flowing through the main valve and if this flow causes a quick drop of the gas pressure.

It may be pointed out that the decompressing device may be considered at the same time as a part of the combination of elements according to this invention or as devices, to which the present invention may be applied in view of the fact that the discharge orifice of a decompressing device is itself an exhausting orifice concerned with the same problems as those solved by this invention.

As new means being in particular able to cause a most rapid opening may be mentioned: A control device constituted of one or more movable conductors in a magnetic field. This allows a considerable reduction of the self-inductance of the control circuit and consequently of its time of response. Another advantage consists in the fact that the movable part is notably lighter than the armature of an electro-magnet, thus notably increasing the speed of action.

Finally the power of the actuating conductor, for the same amount of electric energy, is remarkably higher than the power of an equivalent electro-magnet, thus allowing the reduction in power of the electric source utilised for the control (battery, rectifier and so on).

The conductor of the whole of conductors may be constituted by a light coil comprising only a small number of turns of a wire of light metal of good conductivity such as aluminium.

The magnetic field may be obtained by a permanent magnet or by an electro-magnet permanently excited or at least excited some time before closing the control circuit.

A second means is constituted by an electric motor of any type, electro-magnet, coil or like device controlling the shutter by an initial impulse of a heavy current, causing a rapid action of this electric motor, electro-magnet, coil or like device controlling the electro-valve, whereupon a normal current is substituted to maintain the effect of the impulse.

According to the invention different specific means are available for the generation of said impulse. One means is formed by resistances, the value of which increases with the time, e. g. heating elements with a positive coefficient like incandescent lamps, connected in series or in parallel. A second means is formed by one or more fixed resistances abruptly inserted into the circuit of the electric motor by electro-mechanical or electrical means. A third means, finally, is the use of one or more sources of distinct voltages, of which the most powerful, if not all together, is used during the period of the impulse, the supply during the normal service being provided by one of these sources, conveniently chosen.

Another means according to the present invention consists in the use of a condenser shunted on the source and charged by it, the discharge of this condenser supplying the powerful current-impulse necessary to start rapidly the electric motor, while the normal energy is supplied by the normal source with or without insertion of one or more resistances.

A further device according to the invention consists in a decompression device controlled by an electrovalve and actuating the pneumatic motor which in turn commands the shutting device.

Among the means bound to keep the device in an open position and bound to be combined with the preceding means, new or known, may be every known electrical or mechanical locking device.

As new, however, may be cited any device designed to utilize the pressure of the flowing fluid to maintain the shutting device in an open position, e. g. a device able to increase the effect of the impact of the flowing fluid, or a device able to compensate, in the case of expansion, the decrease of the effect of impact, due to the decrease of pressure as the fluid flows away.

As corresponding to the first example may be considered a device in which the exhausting fluid orifice has a projecting or nozzle form while the surface of the shutter is provided with a bell-shaped body which covers the nozzle in a manner to limit the expansion of the fluid, and, on the other hand, to provide a sufficient clearance between the walls of the nozzle and the bell so as not to hinder the flowing of the fluid.

According to another embodiment of the invention, the device is such as to allow the cross-section of the passage to vary in the same way as the cross section filed by the shutter, thus allowing a more rapid opening of the valve.

A third embodiment is represented by a device in which the setting under pressure of one piston-side is accelerated by a jet of compressed fluid coming from the other side of the piston and preferably in a direction corresponding to the direction of the axis of the exhaust orifice.

As devices able to compensate the decrease of the effect of impact due to decrease of pressure I may describe the following:

A decompressing device combined with a collapsible hollow body communicating with the atmosphere by an outlet the passage cross-section of which varies in the same way as the cross-section uncovered by the shutter. In this device the pressure of the gas contained in the hollow body and tending to press the valve against the outlet, decreases at the same time as the pressure of the fluid flowing through this outlet and tending to remove the valve from the said outlet.

A second solution is given by a device controlling the flow and said device being in turn controlled by a pneumatic motor driven by compressed fluid derived from the flowing fluid. This device is kept in an open position by the action of the compressed fluid contained in the pneumatic motor and whose initial pressure is maintained by the automatic reclosure of the inlet valve of said motor. This inlet-valve may be controlled directly by an electro-valve or a pneumatic device, for instance a decompressing device, controlled by an electro-valve.

The action of the different elements constituting the combinations forming the object of this invention will be explained hereinafter by means of different examples, clearly showing the principle particular to every embodiment. It is to be understood, however, that the mentioned particularities of these examples are not to be considered as limiting the invention. These examples may be adapted, where necessary, and transposed for every case leading to the application of the different elementary improvements constituting this invention, or of their combinations.

On the annexed drawings:

Fig. 5 shows diagrammatically a combination of the pneumatic motor, controlling the discharge device, with a decompressing device controlled by an electro-valve;

Fig. 6 illustrates the device which under the action of compressed air, holds a valve in an open position;

Fig. 10 illustrates a decompressing valve producing an axial jet of compressed fluid;

Fig. 11 shows the combination of the device according to Fig. 5 with a device holding the main valve in an open position under the action of the compressed fluid, which is maintained at its initial pressure.

Figs. 1 and 2 illustrate two particular embodiments controlling the opening of an outlet-valve under the action of an electric-motor. A resistor of a fixed value is inserted in the circuit as soon as the initial impulse has achieved its rapid action.

Figure 1:
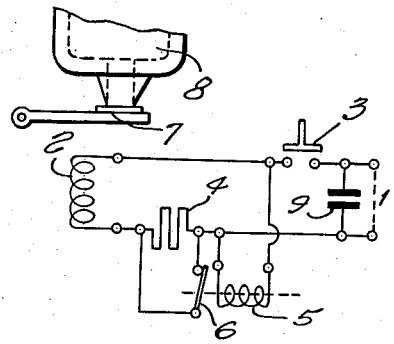
Figs. 1 and 2 illustrate diagrammatically two particular forms of the control, by an impulse, of an outlet valve.

1 is the source supplying the energy to the coil of the electric motor 2, controlled by the switch 3. According to the diagram of Fig. 1, the initial impulse is directly supplied to the electric motor 2 by the source 1, while the normal current is subsequently supplied by the same source through the resistor 4.

In order to obtain this impulse the resistor 4 is shunted by the switch 6, actuated by the coil 5 of a relay connected in parallel with the coil of the electric motor 2.

This device works as follows: In rest position the switch 6 is closed. By closing switch 3, the current of normal voltage of the source 1 is applied abruptly to the electric motor 2 causing an accelerated action.

The check-valve 7 is attracted downwards allowing the outflow of the compressed fluid contained in the decompressing cylinder 8 into the atmosphere, thus bringing the inside of the cylinder to atmospheric pressure. At this moment, the coil 5 of the relay opens the switch 6, inserting the resistor 4 into the circuit of the electric motor and establishing a normal supply at a reduced voltage.

In order to counteract a drop in voltage of the source, a condenser may be shunted to the source forming an auxiliary source of impulse.

In the same manner the coil 5 of the relay may control a double-throw switch connecting a source of lower voltage to the circuit of the electric motor 2, or may control several contracting elements inserted between different sources connected in series, in a way to supply the electric motor at a reduced voltage. In this case the resistor becomes, of course, needless.

Figure 2:
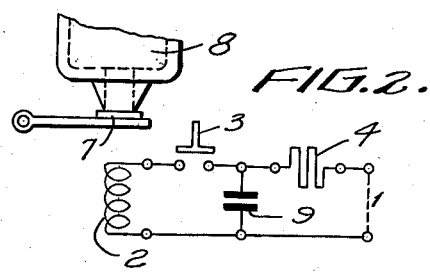

According to the diagram of Fig. 2, a condenser 9 is inserted in shunt in the circuit of the electric motor 2 between the control switch 3 and the resistor 4.

During the rest period the condenser is charged across the resistor 4 by the source 1. When the control-switch closes, the discharge of the condenser produces the initial impulse for the rapid action of the electric motor 2. Once this impulse has passed, the normal supply of the electric motor continues across the resistor 4. If the source 1 supplies the nominal current, the resistor 4 may be omitted, the initial impulse being produced by the source 1 and the discharge of the condenser 9, acting together.

Figure 3:
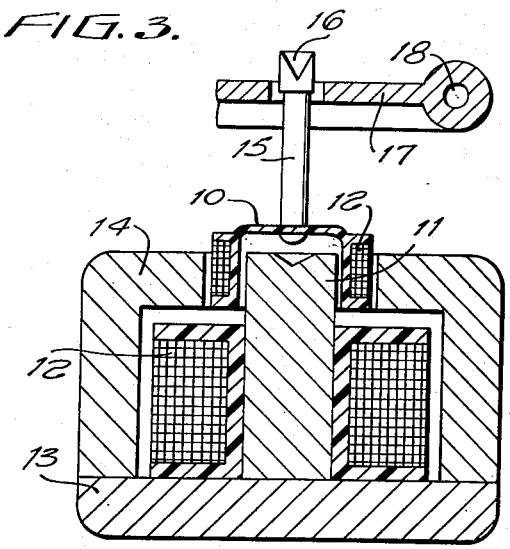
Figs. 3 and 4 are sectional views of a coil placed in a magnetic field and controlling a valve.
Figure 4:
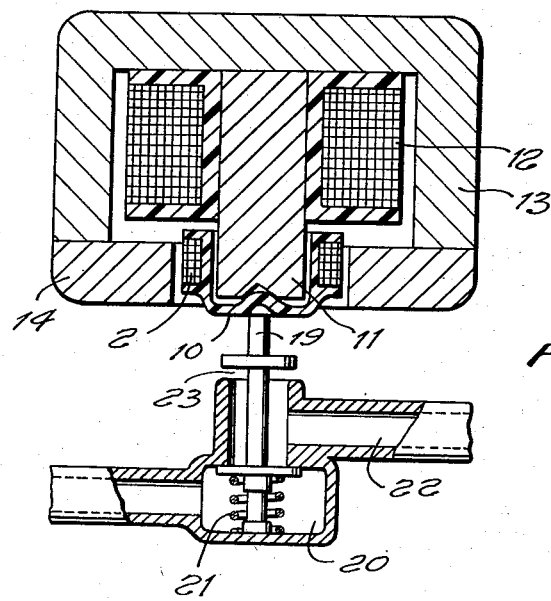

The embodiment shown in Figs. 3 and 4 relates to the electric control of valves by coils placed in a magnetic field.

According to Fig. 3, the conductor or the whole of conductors bound to perform the control, has the form of a coil 2 wound on a light spool 10. This coil may move axially in the annular air gap of a magnetic circuit the core 11 of which may be surrounded by an exciting coil 12, while the magnetic circuit may be completed by a yoke 13 and an armature 14. The spool 10 may transmit its movement to the device controlling the fluid flow by any suitable mechanism, for instance by a rod 15 acting through a knife 16 on a lever 17 pivoted on an actual or geometrical axis 18. The end of this lever may actuate the device controlling the fluid flow. In a special case, this lever may bear a valve, so that when the lever is attracted downwards by the conductor or the conductors, the valve allows the flow of a certain quantity of fluid, contained in an enclosure, for instance, in the part of a cylinder, or in a hollow body, in which a piston, a shutter or a membrane is moving.

Instead of acting by traction, the spool 10 may act by push. This is shown in Fig. 4 which shows an electro-valve according to the invention. The reference numbers 1 to 18 designate the same elements as on Fig. 3. The spool 10, however, pushes the movable part 19 of the valve. This valve is supposed to be kept closed in the rest position by the pressure prevailing in the casing 20 as well as by the compression spring 21. Under these conditions the pipe 22 is maintained under atmospheric pressure by the outlet 23. If a current of suitable direction is applied through the conductor 2, the valve 19 is pushed downwards and opens at the same time as it closes the outlet 23 the enclosure 20, thus allowing the compressed fluid to flow from 20 to 22.

It is to be understood that the invention is not limited to the features described above. In particular the coil 12 may be omitted, although in the embodiments shown on the drawings the magnetic circuit is produced by this coil. In this case the magnetic field may be obtained by the effect of a permanent magnet, which may be obtained by forming the magnetic circuit partly (for instance the core 11) or totally with an alloy of great magnetic remanence.

In the embodiment according to Fig. 5 the device controlling the flow of fluid is not shown, and is controlled by a pneumatic motor actuated by the compressed fluid derived ahead of this device. The inlet valve is directly attached to the cylinder of the motor and controlled by a decompressing device, which is in turn controlled by an electro-valve.

A pipe 24 connects the pneumatic motor to the source of compressed fluid, and 25 is the main cylinder of the pneumatic motor in which slides a piston 26 integral with a piston rod 27.

On the cover of the cylinder 25 is mounted a casing 28 in which opens the pipe 24. The upper part 29 of the casing 28 forms a cylinder in which slides an auxiliary piston 30 connected by the rod 31 to the inlet valve 32. The top of the cylinder 29 has an aperture 33 closed in the rest position by the electro-valve 34. The device works as follows:

In the rest position, the valve 34 closes the aperture 33 and the pressure is constant and balanced in the casing 28 and the cylinder 29.

The auxiliary piston 30 as well as the inlet valve 32 are in their lower position, due to their weight or to the pressure of the fluid or to any other means, for instance a spring (not shown).

The piston 26 is held in its upper position by return means not shown.

For actuating the pneumatic motor it is sufficient to actuate directly or indirectly the valve 34. This valve, when opening the aperture 33, connects the space above the auxiliary piston 30 to the atmosphere.

Thereupon the pressure prevailing in the casing 28 will act on the lower face of the piston and push it rapidly upwards lifting at the same time the inlet valve 32 integral with this piston. Consequently the cylinder 25 will now communicate with the casing 28 allowing the pressure to act on the upper face of the piston 26 and to push it downwards.

In order to compel this piston to make the inverse movement it is sufficient to close the aperture 33 by the valve 34. The pressure reestablishes itself by leakage on the upper face of the auxiliary piston 30, which moves down and closes through the inlet valve 32 the passage between the cylinder 25 and the casing 28. The admission of compressed fluid into the cylinder 25 now is cut off and by providing an outlet, which may be formed by an aperture or any suitable leakage, the pressure is reduced and the piston 26 moves upwards under the action of any return means, for instance a spring (not shown).

The present invention has a great number of applications, especially to the valves for air-blast circuit breakers.

Fig. 6 shows a device, in which the aperture is surrounded by a cylinder bearing the valve 36 closing this aperture. When the valve 36 lifts, the compressed fluid exerts a pressure on a section S much larger than the cross-section s of the aperture; this pressure increases the effect of the electro-magnet thus accelerating the opening of the valve 36.

Figure 7:
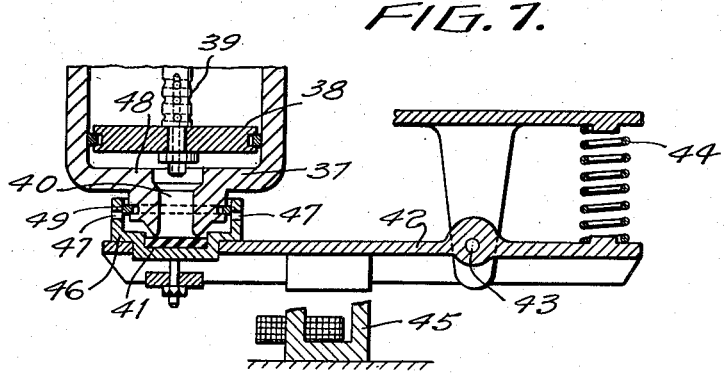
Fig. 7 shows a similar device in which the cross-section of the air passage varies with the cross-section of the passage uncovered by the valve.

The embodiment shown in Fig. 7 is a complement of the previous device, inasmuch as the cross-section of the fluid passage varies with the cross-section of the passage uncovered by the valve.

37 is the cylinder in which slides the piston 38 with the rod 39. The decompressing aperture 40 is closed by the decompressing valve 41. In this case the valve is fixed to a lever 42 pivoting on the actual or geometrical axis 43 and is held in its closed position by one or more springs 44. It is however to be understood that this invention covers any other means or device to hold the valve 41 in a closed position.

The valve 41 may be controlled for instance by an electromagnet 45. A cylindrical cup 46 is attached to the valve 41 so as to surround the latter as well as the nozzle 48 forming the decompressing aperture 40. The sides of the cup are provided with holes 47 which, in the rest position, are partly or wholly closed by piston rings 49. The variable space is enclosed between the side-walls 48 of the decompressing aperture 40, the side-walls of the cup 46, the valve 41 and the piston rings 49.

When the valve 41 opens, the holes 47 are uncovered forming an outlet for the compressed fluid trapped under the piston 38.

Figure 8:
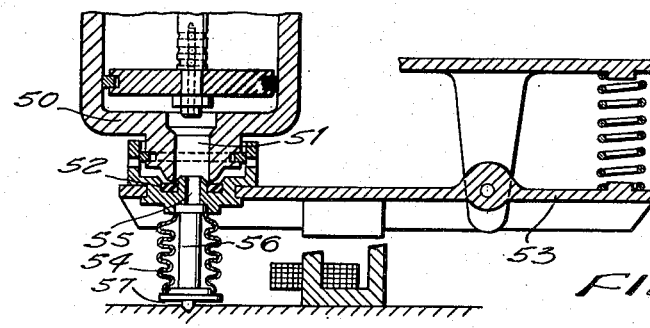
Fig. 8 shows the combination of the valve with a collapsible hollow body with a cross-section of flow varying with the cross-section of flow uncovered by the valve.

Fig. 8 shows a decompressing valve combined with a collapsible casing in form of a bellows. This bellows 54 is mounted on the actuating lever 53, on which presses a spring (not shown) as in Fig. 7. In closed position of the valve, the bellows 54 is filled with compressed gas, as it is in communication with the inside of cylinder 50 by the duct 55. The bellows 54 is provided with an internal metallic cylinder 56, which acts as a guide and reduces the volume of the bellows.

In closed position of the valve, the bellows which under the action of the pressure gas tends to expand presses the valve 52 against its seat. It thus permits on one hand to reduce the power of the controlling spring. On the other hand, the spring exerts a constant pressure on the lever so that in case of momentary over-pressure the tightness of the valve would decrease. The pressure of the bellows 54 on the valve increases with increasing interior pressure thus maintaining the tightness of the valve at a constant value.

When the valve is opened by an impulse given by any suitable device (not shown), which may be an electromagnet as in Fig. 7, the compressed air contained in the bellows expands through the passage uncovered by the valve and in the same proportion as pressure drops in cylinder 50. The pressure of the bellows 54 on the lever 53 thereupon decreases at the same time as the pressure exerted by the pressure gas of cylinder 50 decreases, thus allowing a quick opening of the valve. The bellows 54 may be mounted on a ball joint 55, in order to compensate the deviation due to the non-coaxial movement of the valve.

Figure 9:
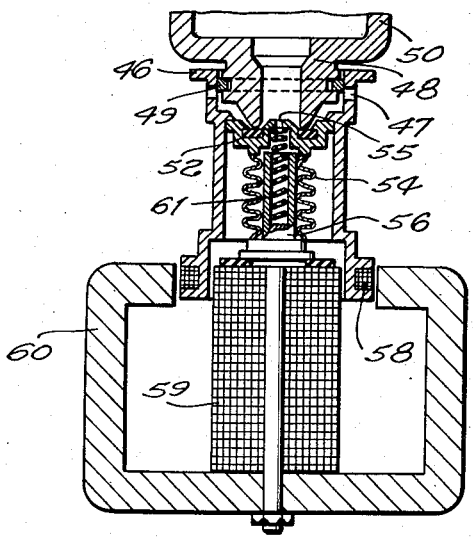
Fig. 9 is a view of a combination of the devices shown on Figs. 7 and 8.

Fig. 9 shows a combination of the device shown in Figs. 7 and 8 cooperating with an electro-valve with electro-dynamic control. In this case the valve is actuated by a conductor or a group of conductors such as a coil 58 movable in the magnetic field produced between the core 59 and the yoke 60 by a coil or a permanent magnet. To the device according to Fig. 8 may be added one or more springs 61 located in a cavity of the cylinder 56 and acting in the same way as the bellows 54 when subjected to pressure. When a current is applied to the coil 58, the latter moves downwards forcing the valve 52 to move downwards too. Thus the decompressing aperture is opened and the holes 47 are uncovered while the spring 61 and the bellows 54 are compressed compelling the compressed fluid contained in the bellows to flow out through the duct 55. In this way, by a small tractive force exerted on the valve, the cylinder 50 is brought rapidly to atmospheric pressure, thus actuating its piston without noticeable delay.

Fig. 10 is a sectional elevation of one type of decompressing device according to the invention. 37 is the cylinder in which slides the piston 38 with the rod 39. At the bottom of the cylinder is the decompressing aperture 40, kept closed in the rest position by the valve 41.

The discharge duct 62 is disposed in the present case in the rod and is coaxial with it. Several lateral channels 63 end in this duct. The cross section of these channels 63 is smaller than the cross section of aperture 40, but the sum of the cross-sections of these channels may be greater than the cross-section of the outflow duct 62.

Filters, not shown in the drawing, may be provided at the entrance of the channels 63 or in the outflow duct 62.

By means of the duct 62 the compartment above the piston 38, which is in direct communication with the supply source of compressed air, communicates with the space under the piston which is the space from which the pressure is to be relieved.

According to the invention, and as shown in the drawing, the discharge duct is coaxial with the aperture 40. The air flowing through the discharge duct 62 will by jet action activate the exhaust of the air from the bottom side of the cylinder and increase the impact on the valve-element.

The whole device operates as follows: the piston 38 is brought in its upper rest position by means not shown, f. i. a spring. The decompressing aperture 40 is closed by the valve 41, whereupon the compressed fluid which fills the upper compartment of the cylinder 37, passes through the channels 63 and the duct 62 and establishes the same pressure in the upper and the bottom compartments of the cylinder 37. In order to operate the pneumatic motor, the valve 41 is opened by any convenient actuating device, and the pressure in the lower compartment is brought to atmospheric pressure notwithstanding the small amount of compressed air flowing out from the duct 62. Thus the balance of pressures, allowing the piston to remain in its upper rest position, is destroyed and the piston 38 under the action of the pressure still prevailing in the upper compartment moves quickly downwards to the end of the stroke.

In order to reverse the movement of the motor it suffices to close the aperture 40 by the valve 41. The pressure then is quickly reestablished on both faces of the piston 38, whereupon the return device mentioned previously brings the piston in its upper rest position.

The invention relates to pneumatic motors in general, but aims particularly at the device obtained by linking the rod 39 to a valve controlling the flow of a compressed fluid.

The embodiment shown in Fig. 11 relates to a combination of the opening device according to Fig. 5 with a device permitting the main valve to be kept open, not by the opening device itself, but by the compressed fluid, which is maintained at its initial pressure by independently and automatically closing the inlet valve, in other words, by reclosing the opening device.

24 is the duct connecting the control device to the source or to the compressed fluid tank, 25 is the cylinder in which moves the piston 26 controlling the main valve 64, both being connected by the rod 27. On the top of the cylinder 26 is fixed the casing 28 containing permanently compressed air arriving through the duct 24. The extension of the casing 28 forms the cylinder 29 in which moves the piston 30 actuating through the rod 31 the inlet valve 32. The top of the cylinder 29 has an aperture 33 kept closed by the valve 34 when in rest position. On opening of the valve the pressure of the cylinder is brought to atmospheric pressure.

64 is the main valve bound to connect the compressed fluid tank 65 with the pipe 66 leading for instance to the breaking device of an electrical circuit-breaker not shown.

The relay-valve 67 in the present case is connected to the cylinder 25 by means of a pointed regulating screw 68. It is to be understood, however, that this derivation may be disposed at any other point of the present device, for instance on the pipe 66, the condition being that the pressure of this point shall be subjected to the opening of the main valve 64.

A second derivation 69, made in the same way, leads to the cylinder 70, in which moves the piston 71 with its rod 72.

The whole device is controlled by the valve for setting to atmospheric pressure 34 actuated, f. i. by an electro-magnet or an electric motor 73, the circuit of which may be broken by an auxiliary switch 74.

The device operates as follows:

The main valve 64 is supposed closed as shown on the drawing. An electric impulse is given to the motor 73 which lifts the decompressing valve 34, bringing the pressure at the upper face of the piston 30 to atmospheric pressure. The pressure in the casing 28, produced by the compressed fluid from the duct 24, drives the piston upwards, which in turn lifts the inlet valve 32, thus connecting the cylinder 25 to the casing 28. The compressed fluid now flowing into the cylinder 25 drives the piston 26 downwards and opens the main valve 64. Thereupon the compressed fluid flows from the tank 65 into the duct 66 and from there to the parts to be controlled. The compressed fluid flows at the same time through the duct 69 into the cylinder 70, drives the piston 71 upwards, which by the rod 72 opens the switch 74. The motor 73, no longer excited, releases the valve 34, which then closes the decompressing aperture 33, whereupon the piston 30 moves down together with the inlet valve, which now separates the casing 28 from the cylinder 25.

Under the pressure of the spring 75, the main control piston 26 tends to begin an ascending movement; this movement however is very slow due to the compressed fluid enclosed at the upper side of the piston. This fluid flows through the pipe 76 connecting the regulating screw 68 to the relay valve 67 and tends to push the piston 77 of this valve downwards and, consequently, to open the outlet valve 78. This happens only when the pressure of the compressed fluid at the upper side of the piston 77 exceeds the tension of the spring 75 increased by the pressure of the compressed fluid on the outlet valve, which takes some time. This time can be controlled by the regulating screw 68.

At this moment the outlet-valve 78 opens, the upper face of the main piston 26 is brought to atmospheric pressure and the piston moves upwards due to the action of the springs 75, thus closing the main valve 64. The pressure in the duct 66 decreases, the piston 71 moves downwards closing the switch 74.

In order to delay the movement of the piston 26, other means may be substituted for the lag relay-valve without departing from the principle of the present invention. So, f. i. the outlet device may be constituted by one or more apertures, which the piston 26 uncovers after having performed a convenient part of its stroke.

In this way, the opening of the main valve for a determinate duration may be obtained with a single current impulse as well as a reduced consumption of compressed fluid.

The present invention can be largely varied as to the form, the arrangement and the combination of the different elements, without departing from the general principle of this invention.

I claim:

1. Fluid control apparatus comprising, in combination, an enclosure adapted to contain a fluid under pressure; valve means operatively connected to and communicating with the interior of said enclosure for controlling the flow of fluid therefrom, said valve means including a valve member movable between a closed position holding the fluid in said enclosure and an open position permitting the fluid to flow from said enclosure through said valve means; pressure means operatively connected to said valve member for urging the same to said closed position thereof and for holding the same in said closed position against the action of the fluid pressure tending to move said valve member to the open position thereof; electromagnetic means located adjacent said valve member for moving the same from said closed to said open position thereof against the action of said pressure means when said electromagnetic means is energized; current-reducing means located in the circuit of said electromagnetic means for reducing the amount of current flowing through the latter; and impact increasing means for increasing the impact of a fluid in said enclosure against said valve member after the latter is moved from said closed position thereof.

2. Fluid control apparatus comprising, in combination, an enclosure adapted to contain a fluid under pressure; valve means operatively connected to and communicating with the interior of said enclosure for controlling the flow of fluid therefrom, said valve means including a valve member movable between a closed position holding the fluid in said enclosure and an open position permitting the fluid to flow from said enclosure through said valve means; pressure means operatively connected to said valve member for urging the same to said closed position thereof and for holding the same in said closed position against the action of the fluid pressure tending to move said valve member to the open position thereof; electromagnetic means located adjacent said valve member for moving the same from said closed to said open position thereof against the action of said pressure means when said electromagnetic means is energized; current-reducing means located in the circuit of said electromagnetic means for reducing the amount of current flowing through the latter; impact increasing means for increasing the impact of a fluid in said enclosure against said valve member after the latter is moved from said closed position thereof; and impact decreasing means for decreasing the impact of the fluid against said valve member after the latter is in said open position thereof.

3. Fluid control apparatus comprising, in combination, an enclosure adapted to contain a fluid under pressure; valve means operatively connected to and communicating with the interior of said enclosure for controlling the flow of fluid therefrom, said valve means including a tubular extension extending from and communicating with said enclosure and having an outer end which forms a valve seat, and a valve member movable between a closed position against said valve seat holding the fluid in the container and an open position away from said valve seat permitting the fluid to flow from the container through said valve means; pressure means operatively connected to said valve member for urging the same to said closed position thereof and for holding the same in said closed position against the action of the fluid pressure tending to move said valve member to the open position thereof; electromagnetic means located adjacent said valve member for moving the same from said closed to said open position thereof against the action of said pressure means when said electromagnetic means is energized; current-reducing means located in the circuit of said electromagnetic means for reducing the amount of current flowing through the latter; and impact increasing means for increasing the impact of a fluid in said enclosure against said valve member after the latter is moved from said closed position thereof, said impact increasing means comprising a cup-shaped member located about said valve member and being connected thereto for movement therewith, said cup-shaped member also being located closely about said extension of said valve member so that after movement of said valve member away from said closed position thereof the fluid in the container flows to the interior of said cup-shaped member to increase the impact of the fluid against said valve member.

4. Fluid control apparatus comprising, in combination, an enclosure adapted to contain a fluid under pressure; valve means operatively connected to and communicating with the interior of said enclosure for controlling the flow of fluid therefrom, said valve means including a tubular extension extending from and communicating with said enclosure and having an outer end which forms a valve seat, and a valve member movable between a closed position against said valve seat holding the fluid in the container and an open position away from said valve seat permitting the fluid to flow from the container through said valve means; pressure means operatively connected to said valve member for urging the same to said closed position thereof and for holding the same in said closed position against the action of the fluid pressure tending to move said valve member to the open position thereof; electromagnetic means located adjacent said valve member for moving the same from said closed to said open position thereof against the action of said pressure means when said electromagnetic means is energized; current-reducing means located in the circuit of said electromagnetic means for reducing the amount of current flowing through the latter; impact increasing means for increasing the impact of a fluid in said enclosure against said valve member after the latter is moved from said closed position thereof, said impact increasing means comprising a cup-shaped member located about said valve member and being connected thereto for movement therewith, said cup-shaped member also being located closely about said extension of said valve member so that after movement of said valve member away from said closed position thereof the fluid in the container flows to the interior of said cup-shaped member to increase the impact of the fluid against said valve member; and impact decreasing means for decreasing the impact of the fluid against said valve member after the latter is in said open position thereof.

5. Fluid control apparatus comprising, in combination, an enclosure adapted to contain a fluid under pressure; valve means operatively connected to and communicating with the interior of said enclosure for controlling the flow of fluid therefrom, said valve means including a tubular extension extending from and communicating with said enclosure and having an outer end which forms a valve seat, and a valve member movable between a closed position against said valve seat holding the fluid in the container and an open position away from said valve seat permitting the fluid to flow from the container through said valve means; pressure means operatively connected to said valve member for urging the same to said closed position thereof and for holding the same in said closed position against the action of the fluid pressure tending to move said valve member to the open position thereof; electromagnetic means located adjacent said valve member for moving the same from said closed to said open position thereof against the action of said pressure means when said electromagnetic means is energized; current-reducing means located in the circuit of said electromagnetic means for reducing the amount of current flowing through the latter; impact increasing means for increasing the impact of a fluid in said enclosure against said valve member after the latter is moved from said closed position thereof, said impact increasing means comprising a cup-shaped member located about said valve member and being connected thereto for movement therewith, said cup-shaped member also being located closely about said extension of said valve member so that after movement of said valve member away from said closed position thereof the fluid in the container flows to the interior of said cup-shaped member to increase the impact of the fluid against said valve member; and impact decreasing means for decreasing the impact of the fluid against said valve member after the latter is in said open position thereof said impact decreasing means comprising at least one portion of said cup-shaped member formed with an opening passing therethrough so that compressed fluid in said cup-shaped member may flow through said opening to the atmosphere for eventually decreasing the pressure of the fluid in said cup-shaped member.

6. Fluid control apparatus comprising in combination, an enclosure adapted to contain a fluid under pressure; valve means operatively connected to and communicating with the interior of said enclosure for controlling the flow of fluid therefrom, said valve means including a valve member movable between a closed position holding the fluid in said enclosure and an open position permitting the fluid to flow from said enclosure through said valve means; pressure means operatively connected to said valve member for urging the same to said closed position thereof and for holding the same in said closed position against the action of the fluid pressure tending to move said valve member to the open position thereof; electromagnetic means located adjacent said valve member for moving the same from said closed to said open position thereof against the action of said pressure means when said electromagnetic means is energized; current-reducing means located in the circuit of said electromagnetic means for reducing the amount of current flowing through the latter; and impact increasing means for increasing the impact of a fluid in said enclosure against said valve member after the latter is moved from said closed position thereof, said impact increasing means comprising an auxiliary source of compressed fluid associated with said valve member for directing compressed fluid against the latter after said valve member moves from said closed position thereof.

7. Fluid control apparatus comprising, in combination, an enclosure adapted to contain a fluid under pressure; valve means operatively connected to and communicating with the interior of said enclosure for controlling the flow of fluid therefrom, said valve means including a valve member movable between a closed position holding the fluid in said enclosure and an open position permitting the fluid to flow from said enclosure through said valve means; pressure means operatively connected to said valve member for urging the same to said closed position thereof and for holding the same in said closed position against the action of the fluid pressure tending to move said valve member to the open position thereof; electromagnetic means located adjacent said valve member for moving the same from said closed to said open position thereof against the action of said pressure means when said electromagnetic means is energized; current-reducing means located in the circuit of said electromagnetic means for reducing the amount of current flowing through the latter; and impact increasing means for increasing the impact of a fluid in said enclosure against said valve member after the latter is moved from said closed position thereof, said impact increasing means comprising an auxiliary source of compressed fluid associated with said valve member for directing compressed fluid against the latter after said valve member moves from said closed position thereof, said auxiliary source of compressed fluid being in the form of a container holding compressed fluid therein and fixed to said valve member on the side thereof opposite from said enclosure, and a portion of said valve member communicating with the interior of said container and enclosure and being formed with an opening passing therethrough so that fluid in said container flows therefrom after said valve member moves from said closed position thereof.

8. Fluid control apparatus comprising, in combination, an enclosure adapted to contain a fluid under pressure; valve means operatively connected to and communicating with the interior of said enclosure for controlling the flow of fluid therefrom, said valve means including a valve member movable between a closed position holding the fluid in said enclosure and an open position permitting the fluid to flow from said enclosure through said valve means; pressure means operatively connected to said valve member for urging the same to said closed position thereof and for holding the same in said closed position against the action of the fluid pressure tending to move said valve member to the open position thereof; electromagnetic means located adjacent said valve member for moving the same from said closed to said open position thereof against the action of said pressure means when said electromagnetic means is energized; current-reducing means located in the circuit of said electromagnetic means for reducing the amount of current flowing through the latter; and impact increasing means for increasing the impact of a fluid in said enclosure against said valve member after the latter is moved from said closed position thereof, said impact increasing means comprising an auxiliary source of compressed fluid associated with said valve member for directing compressed fluid against the latter after said valve member moves from said closed position thereof, said auxiliary source of compressed fluid being in the form of a container holding compressed fluid therein and fixed to said valve member on the side thereof opposite from said enclosure, and a portion of said valve member communicating with the interior of said container and enclosure and being formed with an opening passing therethrough so that fluid in said container flows therefrom after said valve member moves from said closed position thereof, said container having a side wall in the form of a flexible bellows so that the volume of said container may contract and expand.

9. Fluid control apparatus comprising, in combination, an enclosure adapted to contain a fluid under pressure; valve means operatively connected to and communicating with the interior of said enclosure for controlling the flow of fluid therefrom, said valve means including a valve member movable between a closed position holding the fluid in said enclosure and an open position permitting the fluid to flow from said enclosure through said valve means; pressure means operatively connected to said valve member for urging the same to said closed position thereof and for holding the same in said closed position against the action of the fluid pressure tending to move said valve member to the open position thereof; electromagnetic means located adjacent said valve member for moving the same from said closed to said open position thereof against the action of said pressure means when said electromagnetic means is energized; current-reducing means located in the circuit of said electromagnetic means for reducing the amount of current flowing through the latter; and impact increasing means for increasing the impact of a fluid in said enclosure against said valve member after the latter is moved from said closed position thereof, said impact increasing means comprising an auxiliary source of compressed fluid associated with said valve member for directing compressed fluid against the latter after said valve member moves from said closed position thereof, said auxiliary source of compressed fluid being in the form of a container holding compressed fluid therein and fixed to said valve member on the side thereof opposite from said enclosure, and a portion of said valve member communicating with the interior of said container and enclosure and being formed with an opening passing therethrough so that fluid in said container flows therefrom after said valve member moves from said closed position thereof, said container having a side wall in the form of a flexible bellows so that the volume of said container may contract and expand, and said container having a stationary portion distant from said valve member so that the volume of said container decreases during movement of said valve member toward said open position thereof, the fluid pressure in said container acting against said valve member to cooperate with said pressure means for maintaining said valve member in said closed position thereof against the action of fluid in said enclosure.

10. Fluid control apparatus comprising, in combination, an enclosure adapted to contain a fluid under pressure; valve means operatively connected to and communicating with the interior of said enclosure for controlling the flow of fluid therefrom, said valve means including a tubular extension extending from and communicating with said enclosure and having an outer end which forms a valve seat, and a valve member movable between a closed position against said valve seat holding the fluid in the container and an open position away from said valve seat permitting the fluid to flow from the container through said valve means; pressure means operatively connected to said valve member for urging the same to said closed position thereof and for holding the same in said closed position against the action of the fluid pressure tending to move said valve member to the open position thereof; electromagnetic means located adjacent said valve member for moving the same from said closed to said open position thereof against the action of said pressure means when said electromagnetic means is energized; current-reducing means located in the circuit of said electromagnetic means for reducing the amount of current flowing through the latter; impact increasing means for increasing the impact of a fluid in said enclosure against said valve member after the latter is moved from said closed position thereof, said impact increasing means comprising a cup-shaped member located about said valve member and being connected thereto for movement therewith, said cup-shaped member also being located closely about said extension of said valve member so that after movement of said valve member away from said closed position thereof the fluid in the container flows to the interior of said cup-shaped member to increase the impact of the fluid against said valve member, said impact increasing means also including an auxiliary source of compressed fluid associated with said valve member for directing compressed fluid against the latter after said valve member moves from said closed position thereof, said auxiliary source of compressed fluid being in the form of a container holding compressed fluid therein and fixed to said valve member on the side thereof opposite from said enclosure, and a portion of said valve member communicating with the interior of said container and enclosure and being formed with an opening passing therethrough so that fluid in said container flows therefrom after said valve member moves from said closed position thereof, said container having a side wall in the form of a flexible bellows so that the volume of said container may contract and expand, and said container having a stationary portion distant from said valve member so that the volume of said container decreases during movement of said valve member toward said open position thereof, the fluid pressure in said container acting against said valve member to cooperate with said pressure means for maintaining said valve member in said closed position thereof against the action of fluid in said enclosure.

11. Fluid control apparatus comprising, in combination, a conduit having an outlet opening for permitting the escape of fluid therein, said fluid being in said outlet conduit under a predetermined static pressure; a valve member; means mounting said valve member for movement between a closed position seated on said outlet opening and an open position spaced from said outlet opening; urging means permanently urging said valve member from said open to said closed position thereof; impact increasing means combined with said valve member to increase the impact pressure of the escaping fluid on said valve member to a value above the static pressure during movement of said valve member from said closed into said open position and when said valve member is in said open position; electromagnetic means for moving said valve member from said closed to said open position against the action of said urging means less the static pressure exerted by the fluid in said conduit; and current reducing means for reducing the current flowing through said electromagnetic means so that the latter exerts a weaker force for holding said valve member in said open position thereof against the action of the closing force of said urging means less the increased pressure of the escaping fluid created by said impact increasing means.

ANDRÉ LATOUR.

References Cited in the file of this patent

UNITED STATES PATENTS

| Number | Name | Date |
|---|---|---|
| 946,215 | Geissinger | Jan. 11, 1910 |
| 1,087,910 | Grimm | Feb. 17, 1914 |
| 1,142,852 | Simon | June 15, 1915 |
| 1,606,274 | Utley | Nov. 9, 1926 |
| 1,855,415 | Persons | Apr. 26, 1932 |
| 1,915,566 | Younghusband | June 27, 1933 |
| 1,937,929 | Williams | Dec. 5, 1933 |
| 2,051,938 | Carlson | Aug. 25, 1936 |
| 2,257,361 | Yorkey | Sept. 30, 1941 |
| 2,427,751 | Snyder | Sept. 23, 1947 |
| 2,444,471 | Samiran et al. | July 6, 1948 |
| 2,537,308 | Hansen | Jan. 9, 1951 |
| 2,557,536 | Drane et al. | June 19, 1951 |

FOREIGN PATENTS

| Number | Country | Date |
|---|---|---|
| 499 | Great Britain | of 1874 |
| 3,516 | Great Britain | of 1878 |
| 19,690 | Germany | of 1882 |